United States Patent Office 3,135,512
Patented June 2, 1964

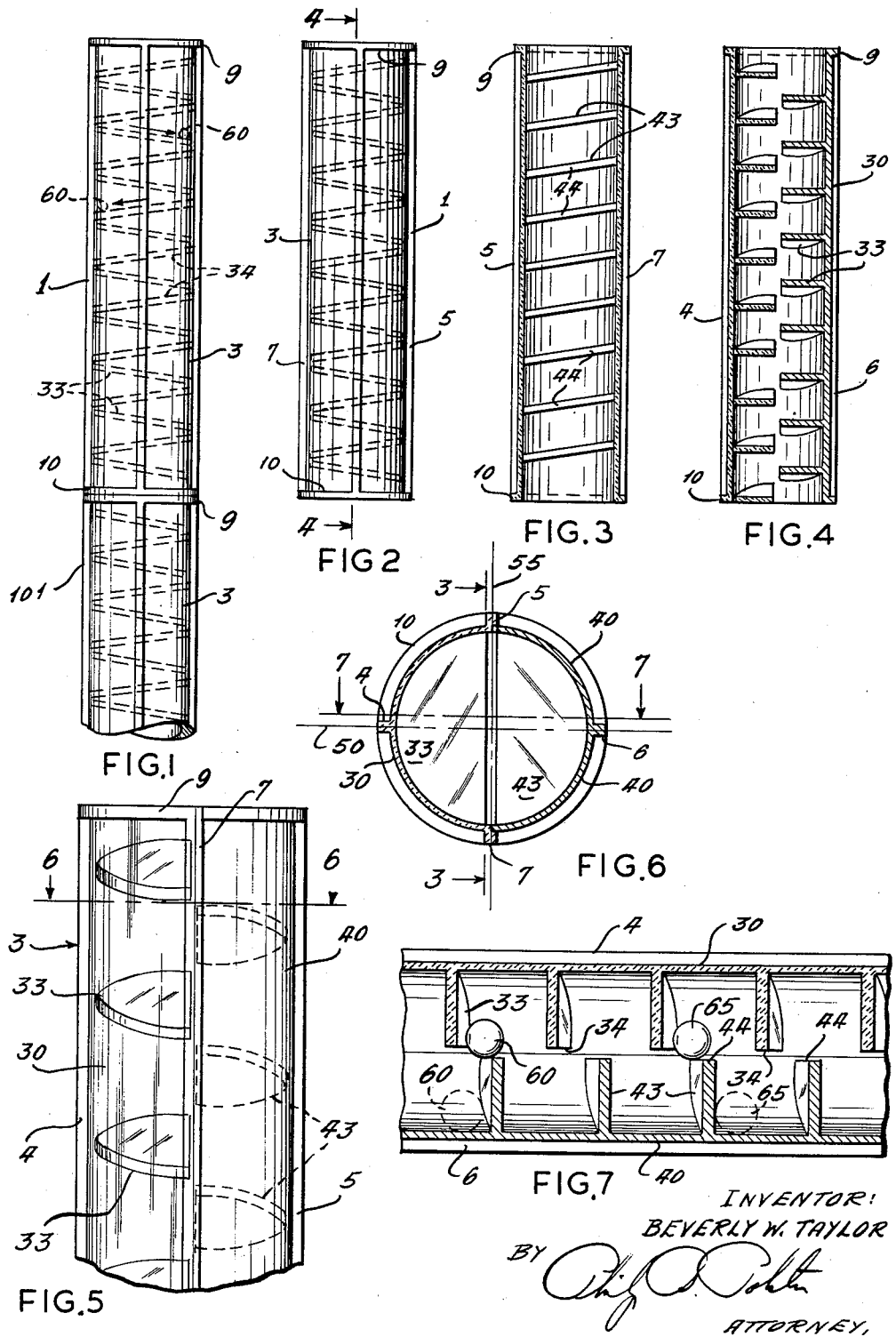

3,135,512
MARBLE TUBE TOY
Beverly W. Taylor, 1820 St. Catherine, Florissant, Mo.
Filed June 4, 1963, Ser. No. 285,481
5 Claims. (Cl. 273—109)

This invention relates to a device which provides education, amusement, and development of skills.

Marble-ramp devices are well known to the art. The patent to Rumbaugh, No. 3,028,704 is an excellent example of a spiral ramp toy. In the device of Rumbaugh, the descent of a ball on the spiral ramp is smooth and substantially noiseless. If several balls are used, they follow each other in regular progression. If the device is used to illustrate the Archimedes' screw principle, the ball follows the spiral ramp in strict accordance with that principle.

One of the objects of this invention is to provide a device of the general character of the Rumbaugh device, but which provides the excitement of noise, by inducing a certain turbulence in the descent of balls within it, and provides more of a challenge in the maintenance of the continuous motion of more than one ball, than is possible with the Rumbaugh device.

Another object of this invention is to provide a device by which the Archimedes principle is apparently disobeyed under some circumstances and obeyed under others.

Still another object is to provide a marble-spiral ramp type device which is easy to manufacture and rugged.

Other objects will become apparent to those skilled in the art in the light of the following description and accompanying drawing.

In accordance with this invention, generally stated, a device is provided in the form of a cylindrical tube, with flights, inside the tube, arranged on two sides of a longitudinal diametric plane. The flights are perpendicular to the plane, but inclined with respect to a second longitudinal plane perpendicular to the first of the planes. Each of the flights on one side of the first plane is at an oblique angle in one direction with respect to the second plane, and each of the flights on the other side of the first plane is at an oblique angle in the other direction with respect to the second plane. The flights on the two sides are staggered, longitudinally of the cylinder, with respect to one another, and are spaced at their adjacent edges from one another.

In the preferred embodiment, the ball used in combination with the cylindrical tube has a radius less than the combined linear width of the least space between successive opposed flights and the thickness of one of the flights. Under these circumstances, the ball will appear to disobey the Archimedean screw principle if the tube is turned easily, and to obey the principle when the tube is turned with agitation, through the angular orientation of the tube from the horizontal within the limits of the workings of the Archimedean screw principle.

In the construction of the device of this invention, the cylinder can be made in two parts, each of which contains one set of parallelly oriented flights, and the two parts then can be joined to form the complete tube.

In the drawing,

FIGURE 1 is a view in side elevation of one embodiment of device of this invention, showing, in fragmentary view, a second device positioned in ball-receiving alignment with a first device;

FIGURE 2 is another view in side elevation of the upper device of FIGURE 1;

FIGURE 3 is a sectional view taken along the line 3—3 of FIGURE 6;

FIGURE 4 is a sectional view taken along the line 4—4 of FIGURE 2;

FIGURE 5 is a fragmentary view in side elevation, at right angles to the view in FIGURES 1 and 2, of the device shown in FIGURES 1-4;

FIGURE 6 is a sectional view taken along the line 6—6 of FIGURE 5; and

FIGURE 7 is a fragmentary sectional view taken along the line 7—7 of FIGURE 6, but with the device turned horizontally.

Referring now to the drawing for one illustrative embodiment of device of this invention, reference numerals 1 and 101 indicate two devices of this invention, which, in this illustrative embodiment are identical.

Each of the devices illustrated consists of an elongated tubular cylinder 3, with longitudinally extending exterior ribs 4, 5, 6 and 7 and end flanges 9 and 10. The ribs 4 and 6 are ornamental and, to some extent, strengthening. The ribs 5 and 7 are, in reality, in the illustrative embodiment shown, integral with one half of the device and serve to help in the assembling of the parts of the device into a unitary whole.

As has been indicated, the cylinder 3 is made of two "halves," 30 and 40. In the embodiment shown, the ribs 5 and 7 are integral with the half 30. The ribs 5 and 7 project for half their circumferential width beyond the margin of the inner wall of the cylinder half 30. The inner walls of both halves 30 and 40 are semi-circular in transverse section. When the two halves are assembled, the ribs 5 and 7, then, extend along the outside wall of the half 40 through half of the circumferential width of the ribs, and are secured to that outside wall, as seen particularly in FIGURE 6.

Within the half 30 of the cylinder 3 are flights 33, parallel with one another, oriented at an oblique angle with respect to a plane 50, and perpendicular to a plane 55. In the embodiment shown, the flights 33 are integral with the inside wall of the cylinder half 30, and have a free chordal edge 34. The plane 55 is a diametric, longitudinally extending plane, through the centers of ribs 5 and 7 and the abutment of the meeting edges of the inner walls of the two halves 30 and 40. The plane 50 and the plane 55 are perpendicular to one another. It can be seen, that in this embodiment, the edges 34 of the flights 33 are parallel with the plane 55, but spaced therefrom. As can be seen from FIGURE 4, the flights 33 in the half 30 extend from a point closely adjacent one end of the cylinder to a point closely adjacent the other end of the cylinder.

The half 40 of the cylinder 3 also is provided with flights, 43, integral with the inner wall of the cylinder half. The flights 43 also have a chordal edge, 44, all of which edges lie in a common plane parallel with the plane 55 and spaced therefrom. The flights 43 are also perpendicular to the plane 55, are parallel with one another, and at an oblique angle to the plane 50. The angle which the flights 43 make with the plane 50 is supplementary to the angle which the flights 33 make with the plane 50, i.e., equal in magnitude and in the opposite direction.

It can be seen that the flights 33 and 43 are staggered with respect to one another, and that their adjacent ends are spaced longitudinally from one another.

In the illustrative embodiment shown, balls 60 and 65 are shown in various positions relative to one another. The balls 60 and 65 are of a radius slightly smaller than the combined linear width of the space between adjacent ends of successive opposed flights and the thickness of one of the flights. The space between adjacent ends of successive flights is slightly less than the radius of the ball, whereas the combined width of one flight and the space is such as to permit the ball to be supported on the face of the chordal edge of the flight, if the device is used either horizontally or at an angle from the horizontal less than the angle of repose of the balls on the flights.

It will be noted that the flights 43 terminate at each of the ends of the cylinders adjacent the inner end of the outermost flight 33. That is to say, the two halves of the cylinder are not identical.

In making the illustrative device shown, the half cylinder 30, flights 33, and ribs 4, 5 and 7 are all molded integrally. The fact that the flights 33 are perpendicular to the plane 50, makes the half easy to remove from the mold.

The cylinder half 40 is similarly made in one piece, with flights 43, and only rib 6. The two halves are then joined by connecting the opposing abutting faces of the edges of their semi-cylindrical walls of the two halves, and the inside surfaces of the ribs 5 and 7 to the outside surface of the half 40 along its margin. This produces a strong unitary whole device.

In the commercial embodiment, one of the halves 30 or 40 is made opaque, the other transparent as is indicated for illustration in FIGURES 5 and 6. It can be seen, however, that the entire cylinder and flights can be made transparent or opaque. However, the former is preferable to the latter, because when the cylinder is transparent, the device is capable of illustrating several principles which might not otherwise be apparent.

If two of the cylinders are used, they may be held vertically, and a ball introduced at the top of one. As the ball approaches the bottom of the first cylinder, the second cylinder can be placed beneath the first one to catch the ball as it comes through, and to permit the ball to continue in its course. Even this, simple, type of use is both exciting and educational in that it teaches coordination, and the bouncing, noisy, progress of the ball down the inside of the cylinder is entertaining.

A second stage of progress in the use of the device consists of the introduction of two or more balls into the open end of the vertically oriented cylinder, and attempting to so control the course of the balls through the cylinder that they may be caught in the second cylinder, then again in the first, and so ad infinitum. This is considerably more difficult than would be the case with a plurality of balls introduced into a smooth, uninterruptedly winding flight, since in the present device, balls tend to become separated from one another, even if they are introduced simultaneously, in the course of their progress down the tube.

A somewhat more refined and educational use of the device is obtained when one inclines a cylinder from the vertical and horizontal enough so that, if the flights were uninterrupted, a ball introduced into the bottom of the cylinder would move, upon rotation of the cylinder in the proper direction, toward the upper end, in accordance with the Archimedean screw principle. With the device of this invention, the ball being supported on the next flight up will appear to disobey that principle, because with the rotation of the cylinder, the divergence of the flight will control, to drop the ball toward the lower end. This is particularly true if the rotation is done cautiously and easily. If, on the other hand, a little agitation is imparted to the ball, it will tend to move off the bearing surface provided by the chordal edge of the flight, and move toward the upper end.

A number of educational variations of this phenomenon can be enjoyed, using a plurality of balls. For example, it is possible to place one ball at each end, and, by proper eccentric rotation of the cylinder, move the two balls toward the center. Conversely, if the balls are positioned at the center of the cylinder, by oscillating the cylinder about a central node, the two balls can be propelled to opposite ends of the cylinder.

It can be seen that the angles of the two sets of flights need not be supplementary, although normally this is the simplest and an entirely satisfactory arrangement. The angles of successive flights on either side need not even be uniform. The chordal edges are preferably spaced away from either side of the diametric plane 55, for a number of reasons. In the embodiment shown, the planes defined by the chordal edges of the flights 43 and 33 are spaced less than the radius of the ball. However, for the use of the device as a simple vertical ramp, there is sufficient throw of the ball between the flights, so that if the vertical spacing is substantial, the spacing between the planes defined by the chordal edges of the flights can be increased. However, the preferred embodiment has a number of advantages in making the refinements, of play and experiment, which have been suggested, feasible.

Having thus described the invention, what is claimed and desired to be secured by Letters Patent is:

1. An amusing and educational device comprising a cylindrical tube, flights in said tube arranged on two sides of a longitudinal diametric plane, said flights being perpendicular to said plane and having inner edges parallel thereto, but spaced therefrom, each of said flights on one side of said plane being at an oblique angle in one direction with respect to a diametric longitudinal second plane perpendicular to said first plane, and each of the flights at the other side of said first plane being at an oblique angle in the other direction with respect to the second plane, the flights on the two sides being staggered longitudinally of the cylinder, with respect to one another.

2. The device of claim 1 wherein a portion of said cylinder and is transparent and a portion is not.

3. The device of claim 2 wherein the transparent portion is constituted by one half of the cylinder on one side of a longitudinal diametric plane.

4. An amusing and educational device comprising a cylindrical tube, flights in said tube arranged on two sides of a longitudinal diametric plane, said flights being perpendicular to said plane and having an inner edge parallel thereto, each of said flights on one side of said plane being at an oblique angle in one direction with respect to a diametric longitudinal second plane perpendicular to said first plane and each of the flights on the other side of said first plane being at an oblique angle in the other direction with respect to the second plane, the flights on the two sides being consecutively staggered, longitudinally of the cylinder, with respect to one another, and having their adjacent ends spaced longitudinally.

5. The device of claim 4 in combination with a ball of a radius less than the combined linear width of the space between adjacent ends of successive opposed flights and the thickness of one of the flights, and the width of said space being less than the diameter of said ball whereby the ball appears to disobey the Archimedean screw principle if the tube is turned easily and to obey the said principle when the tube is turned with agitation through a limited angular orientation of said tube from the horizontal.

References Cited in the file of this patent
UNITED STATES PATENTS

| | | |
|---|---|---|
| 2,931,131 | Morse | Apr. 5, 1960 |
| 3,028,704 | Rumbaugh | Apr. 10, 1962 |